No. 808,985. PATENTED JAN. 2, 1906.
J. J. HAROLD.
METAL PILING.
APPLICATION FILED DEC. 22, 1904.
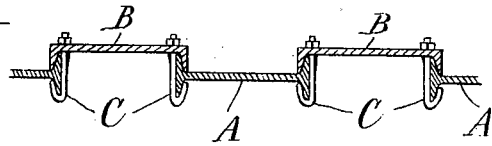
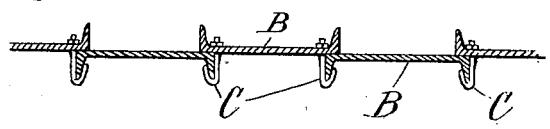
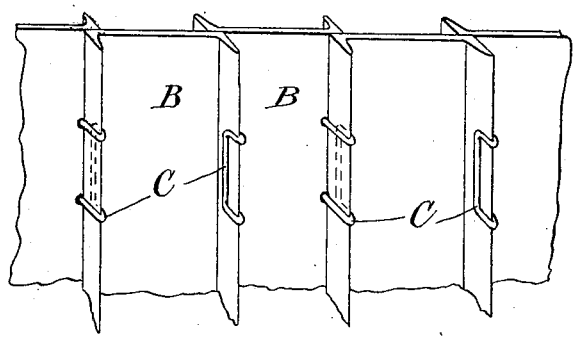
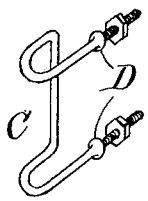
Witnesses
Ivan Konigsberg
Annie Kissmann
James J. Harold Inventor
By his Attorney
Thomas A. Hill

UNITED STATES PATENT OFFICE.

JAMES J. HAROLD, OF JERSEY CITY, NEW JERSEY, ASSIGNOR, BY MESNE ASSIGNMENTS, TO EMMA HAROLD, OF JERSEY CITY, NEW JERSEY.

METAL PILING.

No. 808,985.     Specification of Letters Patent.     Patented Jan. 2, 1906.

Application filed December 22, 1904. Serial No. 237,873.

*To all whom it may concern:*

Be it known that I, JAMES J. HAROLD, a citizen of the United States of America, residing at Jersey City, in the county of Hudson and State of New Jersey, have invented certain new and useful Improvements in Metal Piling, of which the following is a specification, reference being had therein to the accompanying drawings.

My invention relates to improvements in metallic piling as used in subway, foundation, and irrigation work, dams, mine-shafts, caissons, sea-walls, locks, coffer-dams, retaining-walls, and similar structures, and comprises flanged beams, such as I-beams or channel-beams, interlocked by bolts.

Referring to the accompanying drawings, Figure 1 is an end view of a run of my piling, showing one way for interlocking I-beams and channel-beams by bolts. Fig. 2 is an end view of another run of my piling, showing the manner in which the channel-beams are preferably interlocked. Fig. 3 is a view in perspective of Fig. 2. Fig. 4 shows a loop form of hook-bolt, and Fig. 5 an ordinary hook-bolt.

A represents the I-beams, B the channel-beams, and C the bolts. Where I-beams and channel-beams are to be used together, the bolts are preferably passed through the channel-beams and secured thereto by a nut at the back thereof, the hook of each bolt engaging one of the flanges of the I-beams, as shown in Fig. 1. Where only channel-beams are to be used, the hook of each bolt preferably engages one of the flanges of the channel-beams, as shown in Fig. 2, and for this purpose an ordinary hook-bolt, such as shown in Fig. 5 may be used or a loop form of hook-bolt, as shown in Fig. 4. In either case a shoulder D is preferably formed upon the shank of the bolt close to the threads, so that the same may be tightened against the beam member before engaging the flange of the adjoining beam member.

In construction one of the beam members is driven into place in the usual manner. Then a beam member having holes for the bolts may be driven alongside, and each bolt may be passed through same and engage the flange of the adjoining beam member as the second beam is driven into place. Of course there are other modifications which can be made without departing from the spirit of my invention.

What I claim is—

1. In piling, flanged beam members and interlocking bolts, said interlocking bolts adapted to receive flanges of said beam members and lock said beam members together.

2. In piling, channel-beams and interlocking bolts, said bolts adapted to receive the flanges of said channel-beams and lock said beams together.

3. In piling, the flanges of channel-beams turned away from each other, and the backs of said channel-beams locked together by interlocking bolts engaging some of said flanges.

4. In piling, flanged beam members and interlocking bolts, said interlocking bolts having looped hooks, and adapted to receive and lock the flanges of said beam members.

In testimony whereof I affix my signature in presence of two witnesses.

JAMES J. HAROLD.

Witnesses:
    BEATRICE UNGER,
    THOMAS A. HILL.